Figures 1, 2, 3:
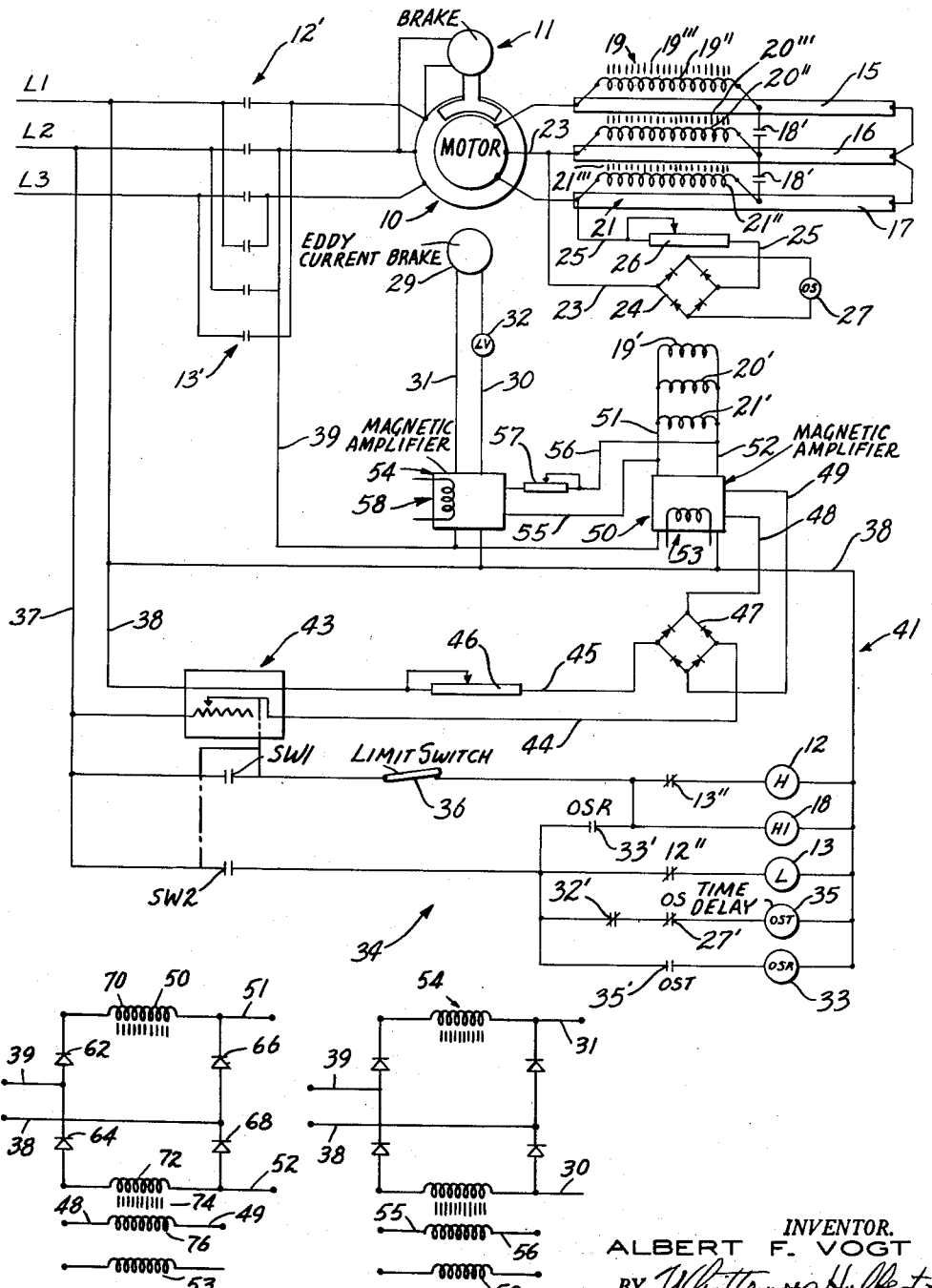

April 10, 1962 A. F. VOGT 3,029,372
STEPLESS HOIST CONTROL
Filed Sept. 15, 1958

INVENTOR.
ALBERT F. VOGT
BY Whittemore, Hulbert &
Belknap
ATTORNEYS

United States Patent Office 3,029,372
Patented Apr. 10, 1962

3,029,372
STEPLESS HOIST CONTROL
Albert F. Vogt, St. Clair Shores, Mich., assignor to Northern Engineering Works, Detroit, Mich., a corporation of Michigan
Filed Sept. 15, 1958, Ser. No. 761,066
8 Claims. (Cl. 318—204)

The present invention relates to improved motor speed control means having its principal application in a motor operated hoist, although it may also be employed in other machine settings in which a load is continually on the motor of the unit. More particularly, the invention affords a stepless control for an induction motor over a wide speed range in either direction of operation of the motor, by reason of the use of magnetic amplifier means to regulate saturable reactor means in the usual motor circuitry, preferably in the external or secondary portion of the latter.

It is an object of the invention to provide an improved hoist control which, in comparison with previous comparable controls, is stepless in action, as indicated above; which is not solely responsive in operation to motor speed or other conditions reflecting motor performance, but is on the contrary governed primarily through a master variable voltage; which does not rely on the use of variable resistor or impedance means in the rotor circuit, nor upon electronic means including thyratron tubes, etc., therein; and in which, in a preferred embodiment, reliance is not placed on an additional pilot motor or upon some sort of voltage generator to regulate speed of the hoist motor.

In attaining these objectives the improved system, features a set of saturable reactors connected in parallel with portions of the usual external resistance of the motor, with inductive control windings for the respective reactors energized through a magnetic amplifier, under the control of a suitable master voltage controller, to induce a rectified D.C. control voltage in the reactor unit proper.

In a preferred embodiment of the invention the hoist motor is operated in association with a known type of eddy current brake, which is excited through a second magnetic amplifier. The input leads of this second amplifier are connected to the output terminals of the first, or saturable reactor controlling amplifier, so that the eddy current brake and saturable reactors are oppositely energized. Thus when the master controller is set for maximum voltage application to the first magnetic amplifier, with minimum or zero output of the latter to energize the saturable reactor control windings, the second magnetic amplifier will also have minimum or zero voltage applied thereto and its brake excitation output is then a maximum, and vice versa. Motor speed is held at any intermediate value by manipulating the master controller in this manner to adjust inversely the eddy current and saturable reactor voltage in this manner.

Another object is to provide a motor control of this type in which the circuit is so devised the load will not lower at unsafe speeds. To this end a relay in the circuit of the eddy current brake is set to drop out at a predetermined voltage to the latter, and when it drops out it sets up an overspeed control circuit. This in turn consists of a voltage relay which drops out at close to motor synchronous speed, and a further control relay.

As a result the eddy current brake relay referred to serves several purposes. It provides protection in case the excitation to the eddy current brake is lost so that the load cannot lower at unsafe speeds. It sets up an overspeed circuit for heavy loads when the brake excitation drops below a predetermined value, and finally, it drops out the overspeed circuit in case the operator intends to slow down the load by bringing the master controller back toward the off point.

Another object is to provide a control in which, at synchronous speed, the saturable reactors will act as a short, thus causing the motor to produce regenerative braking which keeps the load at a safe speed.

Other objects and features of the invention will become apparent as the description proceeds, especially when taken in conjunction with the accompanying drawings, illustrating preferred embodiments of the invention wherein:

FIG. 1 is a schematic wiring diagram of a circuit or system featuring the principle of stepless motor speed control by saturable reactor, magnetic amplifier, eddy current brake and master controller components, in accordance with a preferred embodiment of the invention; and FIGURES 2 and 3 are schematic diagrams of the magnetic amplifier illustrated in block diagram form in FIGURE 1.

Referring to FIG. 1, the reference numeral 10 designates an induction motor of the wound rotor type, although certain changes in the saturable reactor connections will enable the use of a squirrel cage motor. Motor 10, in an application to a hoist, is conventionally connected to the shaft of a hoist drum (not shown), which is equipped with a conventional electrically operated shoe or disc brake 11. Brake 11 is connected for energization to two of the three phase supply leads $L_1$, $L_2$ and $L_3$ of motor 10. These are controlled by sets 12' and 13' of "hoist" and "lower" contacts, respectively, of contactors 12, 13 in the main operating circuit of the hoist motor, in the usual manner.

The rotor circuit of motor 10 has resistors 15, 16 and 17 connected thereto in a conventional way, with contacts 18' of a contactor 18 in the motor operating circuit in shunting relation thereto; and the reference numerals 19, 20 and 21 designate saturable reactors including primary windings 19", 20" and 21" and cores 19''', 20''' and 21'''' whose respective control windings 19', 20' and 21' and selectively energized to cause the reactors to condition the rotor or secondary circuit for desired motor speed. Reactor primary windings 19", 20" and 21" have common connection with the contacts 18' to the resistances 15, 16 and 17 at a point of intermediate ohmage value along the latter.

Two of the external resistance terminals of motor 10 are employed to provide an overspeed protection for the system. For this purpose a lead 23 connects one phase with an input terminal of a conventional rectifier 24, the other input terminal of which returns to another phase through a lead 25 and variable resistor 26. An overspeed voltage relay 27 is connected across the output terminals of rectifier 24, and relay 27 is set to drop out when motor 10 attains 95% of synchronous speed so that contacts 27' are closed only after the motor 10 attains 90% of synchronous speed.

The reference numeral 29 designates an eddy current brake of known type excited through leads 30, 31, in one of which a relay 32 is wired. Relay 32 is set to drop out at 35% of maximum voltage applied to eddy current brake 29, and in doing so it closes contacts 32' at voltages below said 35% and sets up the overspeed circuit including voltage relay 27, as well as a further overspeed control relay 33 connected as shown in the "hoist" and "lower" operating circuit 34 of the system, as referred to above. A further time delay relay 35, having a delay interval of one-half second, is also wired in this operating circuit, and contacts of the four relays 27, 32, 33 and 35, as connected in the circuit 34, are designated by corresponding reference numerals, primed. A "hoist" limit switch 36 is placed in the operating circuit 34 in a known manner.

Leads 37, 38 and 39 connect two of the motor supply phase leads $L_1$ and $L_2$ with the motor operating circuit 34 and a speed control circuit for the system, generally designated 41 and including the control windings 19', 20' and 21' of the saturable reactors. Also included in this circuit are the two above mentioned magnetic amplifiers variably energizing the windings 19', 20', 21' and the eddy current brake 29, respectively, as well as the master controller referred to, under the control of which a rectified D.C. control voltage is applied to the amplifier 50.

The master controller or switch means is designated 43, and may be a variable transformer of a conventional manually operated, stepless selector type, or a manually operated variable resistor as shown. It is supplied through the A.C. leads 37, 38 and has output connections 44, 45, the latter including a variable resistor 46 for range control, with the input terminals of a second rectifier 47. The output of rectifier 47 is connected by leads 48, 49 to the control winding of a first magnetic amplifier 50 of standard type; which is so biased as indicated at 53 that when this winding has maximum voltage applied thereto through master controller 43 its output through leads 51, 52 to the saturable reactor control windings 19', 20', 21' will be a minimum or zero and the saturable reactors will be relatively de-energized.

The magnetic amplifier 50 is schematically shown in more detail in FIGURE 2 and comprises the rectifiers 62, 64, 66 and 68 connected as shown between the line voltage conductors 38 and 39, the primary coils 70 and 72, saturable core 74, control coil 76 connected to conductors 48 and 49 from the rectifier 47 and bias coil 53 which may be connected to a suitable bias voltage source (not shown).

In operation the bias voltage of coil 53 may be chosen to produce maximum output across conductors 51 and 52 due to saturation of core 74. The voltage across coil 76 is then chosen to oppose the voltage across coil 53 whereby on increase of the voltage across coil 76 due to manipulation of the master controller 43 the output of the amplifier across the conductors 51 and 52 will be caused to vary inversely thereto.

A second magnetic amplifier 54 shown best in FIG. 3, whose output is applied through leads 30, 31 and relay 32 to the eddy current brake 29, has its input side connected through leads 55 and 56 (with a variable resistor 57 in the latter) to the output leads 51, 52 of the first magnetic amplifier 50. The operation of amplifier 54 is similar to that of amplifier 50. Thus with the control winding of amplifier 50 under maximum energization for a minimum output the control winding of second amplifier 54 will have minimum energization. The result is that amplifier 54, as supplied by the phase connected leads 38 and 39 and biased as indicated at 58, will have a maximum output for maximum excitation of eddy current brake 29. Conversely, when there is maximum energization of the saturable reactors the brake 29 will be under minimum excitation; and the relationship holds in intermediate settings of the master variable voltage controller 43.

In operation, as the master controller 43 is manipulated in the "hoist" direction the contactors 12 and 18 the energizing contacts SW1 for which may be mechanically connected to the master controller as indicated at 78 initially close and maximum voltage is applied to the control winding of first magnetic amplifier 50, whose output voltage is thus made zero. Minimum voltage is applied to the second magnetic amplifier 54, so that its output is a maximum.

The above arrangement provides 100% excitation on the eddy current brake 29 and zero voltage on the saturable reactor control windings 19', 20' and 21'. The closing of contactor 18 leaves about 90% ohms in the secondary circuit of the motor 10. This provides enough torque so heavy loads will not lower.

In order to hoist at a faster rate the master controller or switch 43 is moved to higher speed settings, and its voltage output gradually decreases to zero. This in turn applies maximum voltage to the saturable reactor control windings 19', 20', 21' and zero excitation voltage on the eddy current brake 29, thus producing maximum hoisting speed. The speed may be held at any value in between.

In operating to lower, the hoist contactor 13 the energizing contacts SW2 for which may also be mechanically connected to controller 43, as shown at 80 closes and maximum voltage is applied to the control winding of magnetic amplifier 50 for a zero output voltage of the same. Minimum voltage is applied to amplifier 54, whose output is then a maximum.

The above arrangement provides 100% excitation on the eddy current brake 29 and zero voltage on the saturable reactor control windings. 200% ohms are in the secondary circuit of the motor 10, which provides about 50% drive down torque.

In order to lower at a faster rate, the master switch 43 is moved to higher speed settings, its voltage gradually decreasing to zero. This in turn applies maximum voltage to the saturable reactor control windings and zero voltage to the eddy current brake, thus producing maximum lowering speed.

The circuit is designed so the load will not lower at unsafe speeds. As indicated above, relay 32 in the brake excitation line normally holds contacts 32' open and is set to drop out of a 35% voltage supply to the eddy current brake 29 closing contacts 32' for a voltage supply below 35%. When relay 32 drops out it sets up the overspeed circuit consisting of the voltage relay 27, which drops out at 95% of synchronous speed to closed contacts 27', and energize the control relay 33 by means of contacts 33' of relay 35. The purpose of time delay relay 35 is to allow time for relay 27 to pick up when the cycle is started.

Relay 32 serves to prevent dropping of the load in the event of failure of excitation to the eddy current brake. It also conditions the overspeed circuit for heavy loads with the brake excitation dropped below 35%; and it drops out the overspeed circuit should the operator desire to slow down the load by bringing the master controller 43 toward off point.

When the relay 33 is energized by closing of contacts 35' at approximately synchronous speed of motor 10 contacts 33' will close energizing contactor 18 to close controls 18'. With contacts 18' closed since the frequency is near zero the saturable reactors will act as a short and keep the load at a safe speed through regenerative braking. That is to say with the saturable reactors acting as a short optimum regenerative braking will take place in the motor at motor speeds above synchronous speed.

The system of the invention is a very sensitive one, in which the application of a very slight voltage on the control winding of the magnetic amplifier 50 or 59 will vary its output from zero to maximum. It is essentially responsive in controlling motor speed to a stepless manipulation of a master controller and, other than the saturable reactor, requires no special speed regulating provisions (pilot motor, electronic, resistive, etc.,) to affect either the standard rotor or input circuits of the motor 10.

What I claim as my invention is:

1. A speed control system for an induction hoist or like motor having primary and secondary circuits, comprising a saturable reactor unit connected in one of said circuits and having a core, a main winding, and a control winding for saturating the core to reduce the self inductance of the main winding whereby the speed of said motor may be controlled, a magnetic amplifier having means to electrically supply and energize the same and having its output connected to said reactor control winding, a master voltage controller unit having means supplying voltage thereto and having its output connected to said magnetic amplifier, means to produce an output voltage from said amplifier to said control winding which varies inversely in value with the voltage applied by the controller unit to said amplifier, and brake means associated with said motor and operable to control motor speed conjointly with said saturable reactor unit.

2. A speed control system for an induction hoist or like motor having primary and secondary circuits, comprising a saturable reactor unit connected in one of said circuits and having a core, a main winding, and a control winding for saturating the core to reduce the self inductance of the main winding whereby the speed of said motor may be controlled, a magnetic amplifier having means to electrically supply and energize the same and having its output connected to said reactor control winding, a master voltage controller unit having means supplying voltage thereto and having its output connected to said magnetic amplifier, means to produce an output voltage from said amplifier to said control winding which varies inversely in value with the voltage applied by the controller unit to said amplifier, and brake means associated with said motor and operable to effect said motor inversely of the effect of said saturable reactor unit to control motor speed conjointly with the latter.

3. A speed control system for an induction hoist or like motor having primary and secondary circuits, comprising a saturable reactor unit connected in one of said circuits and having a core, a main winding, and a control winding for saturating the core to reduce the self inductance of the main winding whereby the speed of said motor may be controlled, a first magnetic amplifier having means to electrically supply and energize the same and having its output connected to said reactor control winding, a master voltage controller unit having means supplying voltage thereto and having its output connected to said magnetic amplifier, means to produce an output voltage from said amplifier to said control winding which varies inversely in value with the voltage applied by the controller unit to said amplifier and further means effective on said motor inversely of the effect of said saturable reactor unit to control motor speed conjointly with the latter, comprising an eddy current brake applied to the motor, and a second magnetic amplifier provided with means to electrically energize the same and connected to said brake to supply excitation voltage thereto, said second magnetic amplifier having its input side connected to the output of said first magnetic amplifier and having an output voltage that varies inversely with voltage input thereto.

4. A control system in accordance with claim 3, and including overspeed protection means including an operating circuit having contacts therein operable to ready the operating circuit for completion in which system the excitation connection of said second magnetic amplifier to said eddy current brake includes a protective relay operating to close said contacts at eddy current brake excitation below a predetermined amount so that the operating circuit can be completed at a predetermined motor speed.

5. A control system in accordance with claim 4, in which the overspeed protection means also includes an overspeed protection circuit connected in the motor secondary circuit, including a variable resistor and rectifier in series and connected in shunt with part of said secondary circuit, and a relay operably associated with said rectifier for closing relay contacts in said operating circuit at a motor speed approaching close to synchronous speed to complete said operating circuit.

6. A control system in accordance with claim 5 wherein parallel resistances are provided in said one circuit and said overspeed protection means also includes contacts which when closed short out a portion of said parallel resistances to produce optimum regenerative braking of said motor at motor speed above synchronous motor speed, and means in said operating circuit for closing said contacts on completion of said operating circuit.

7. A speed control system for an induction hoist or like motor having primary and secondary circuits, comprising a saturable reactor unit connected in one of said circuits and having a core, a main winding, and a control winding for saturating the core to reduce the self inductance of the main winding whereby the speed of said motor may be controlled, a magnetic amplifier having means to electrically supply and energize the same and having its output connected to said reactor control winding, a master voltage controller unit having means supplying voltage thereto and having its output connected to said magnetic amplifier, means to produce an output voltage from said amplifier to said control winding which varies in value with the voltage applied by the controller unit to said amplifier, and brake means associated with said motor and operable to control motor speed conjointly with said saturable reactor unit.

8. A speed control system for an induction hoist or like motor having primary and secondary circuits, comprising a saturable reactor unit connected in one of said circuits and having a control winding, a magnetic amplifier having means to electrically supply and energize the same and having its output connected to said reactor control winding, a master voltage controller unit having means supplying voltage thereto and having its output connected to said magnetic amplifier, means to produce an output voltage from said amplifier to said control winding which varies in value with the voltage applied by the controller unit to said amplifier, and brake means associated with said motor and operable to control motor speed conjointly with said saturable reactor unit.

References Cited in the file of this patent
UNITED STATES PATENTS 2,793,338     Rhyne _____ May 21, 1957